United States Patent
Pickard

[15] 3,674,981

[45] July 4, 1972

[54] ELECTRICALLY HEATED STEAM-RAISING AUTOCLAVE

[72] Inventor: Henry M. Hattersley Pickard, Stanningley, Pudsey, England

[22] Filed: Jan. 11, 1971

[21] Appl. No.: 105,523

[30] Foreign Application Priority Data

Jan. 9, 1970 Great Britain..........................1,233/70

[52] U.S. Cl..............................219/401, 219/439, 219/440, 126/369
[51] Int. Cl......................................................F27d 11/00
[58] Field of Search..................219/437, 439, 440, 430, 431, 219/533, 401, 399; 126/369

[56] References Cited

UNITED STATES PATENTS

| | | | |
|---|---|---|---|
| 2,006,059 | 6/1935 | Rudorff | 219/439 |
| 2,236,837 | 4/1941 | Rimmel | 219/430 X |
| 2,279,000 | 4/1942 | Larson | 219/439 |
| 2,623,449 | 12/1952 | Losee | 219/439 X |
| 2,659,802 | 11/1953 | Garrett et al. | 219/401 |
| 2,762,895 | 11/1956 | Throw | 219/401 X |
| 3,320,945 | 5/1967 | Dunkelman | 126/369 |
| 3,428,783 | 2/1969 | Niles | 219/399 |
| 3,432,642 | 3/1969 | Löhr et al. | 219/439 |
| 3,491,227 | 1/1970 | Stephens | 219/439 |
| 3,495,071 | 2/1970 | Niles | 219/401 |

FOREIGN PATENTS OR APPLICATIONS

| | | | |
|---|---|---|---|
| 19,771 | 0/1912 | Great Britain | 219/431 |
| 91,988 | 10/1961 | Denmark | 219/401 |
| 258,804 | 5/1949 | Switzerland | 219/439 |
| 719,177 | 3/1942 | Germany | 219/439 |
| 944,495 | 11/1948 | France | 219/430 |
| 1,306,374 | 9/1962 | France | 219/439 |

*Primary Examiner*—Volodymyr Y. Mayewsky
*Attorney*—Groff & Groff

[57] ABSTRACT

A steam-raising autoclave having an outer jacket, an inner pan, an enclosed space between said outer jacket and the inner pan, and electrical heating means for heating water within the enclosed space for producing steam. The outer jacket is made of larger diameter or longer than usual, or both, in order to make the space between the outer jacket and the inner pan larger than usual for containing a required amount of water.

5 Claims, 3 Drawing Figures

INVENTOR
HENRY M. H. PICKARD
BY
Emary L. Groff Jr.
ATTORNEY

PATENTED JUL 4 1972

INVENTOR
HENRY M.H. PICKARD
BY
*Emery L. Groff*
ATTORNEY

ELECTRICALLY HEATED STEAM-RAISING AUTOCLAVE

CROSS-REFERENCES TO RELATED APPLICATIONS

British application No. 1233/70 dated Jan. 9, 1970.

BACKGROUND OF THE INVENTION

This invention relates to a steam-raising autoclave and has for its object the provision of a jacketed steam-raising autoclave which is of simple design and highly efficient in use.

SUMMARY OF THE INVENTION

The invention consists in the provision of a jacketted steam-raising autoclave which comprises a. a cylindrical outer jacket made of thick steel plate to provide a wall thickness (e.g., of one-half inch) capable of withstanding a steam pressure of several atmospheres and closed at its rear end by a domed end wall, b. a cylindrical inner pan made of thick steel plate to provide a wall thickness (e.g., of one-half inch) capable of withstanding a steam pressure of several atmospheres and closed at its rear end by a domed end wall, c. said jacket and inner pan being dimensioned to provide between themselves an annular space between their cylindrical walls and a space between their domed end walls in which steam can be generated from water supplied to said spaces, d. the adjacent front ends of said jacket and inner pan being secured together to close the front end of said annular space, e. a closure door fitted to the front of said inner pan, f. electric heating means for heating the water in the space between the outer jacket and said inner pan for generating steam to said pressure of several atmospheres, and g. means for feeding steam from the top of said outer jacket to said inner pan, h. the autoclave also being fitted with pressure gauges, cut-outs and other appropriate devices as would be the case in a normal steam-raising boiler.

DESCRIPTION OF PREFERRED EMBODIMENTS

Figure 1:
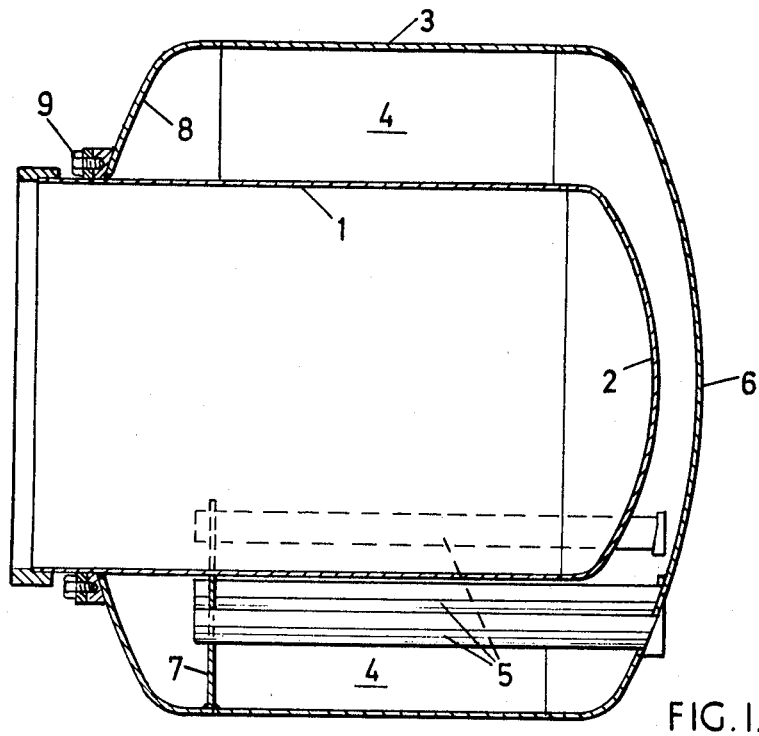
FIG. 1 is a longitudinal section of an autoclave according to one embodiment in which the jacket is made of larger diameter than usual.
Figure 2:
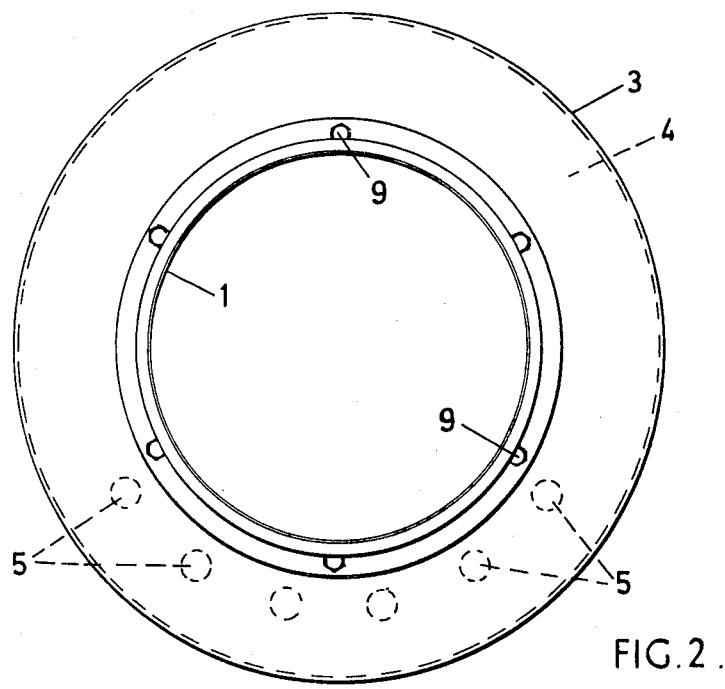
FIG. 2 is a front elevation of FIG. 1.

Referring firstly to FIGS. 1 and 2 of said drawings, the autoclave of this embodiment of the invention comprises an inner pan 1 closed at its rear end by a dome or wall 2, and around which is provided a jacket 3 of larger diameter than usual to provide an annular space 4 of increased capacity for containing a required predetermined quantity of water.

Fitted within the lower part of said annular space 4 are six or any other required number of electric heating elements 5, which may be mounted in the rear wall 6 of the jacket 3 and supported at their inner ends within said annular space 4 by a plate 7.

Thus, when the jacket 3 is about half filled with water the latter is heated by said immersion heaters 5, and the autoclave acts as a steam raising boiler. When required, the steam from the top of the jacket 3 may be fed into the inner pan 1.

Alternative forms of electric heating elements may be employed, such a conventional disc-like or band-like electric heating elements adapted to be strapped or otherwise held against the outer surface of the jacket 3.

Alternatively, the back end could be bolted on when the heating elements could be fitted nearer the outer edge of the jacket.

Usual boiler fittings such as a feed pump, level and pressure gauges, cut outs and other appropriate devices will be fitted to the autoclave as would be the case in a normal steam raising boiler.

Where the inner pan 1 passes through the front end 8 of the jacket a welded joint can be made, but the two can instead be bolted together by a multiplicity of bolts, only six of which are indicated at 9, for low pressure constructions. This has the big advantage of enabling complete dismantling to be done at any time when all the metal surfaces will be easily examined and, if necessary, easily repaired.

Figure 3:
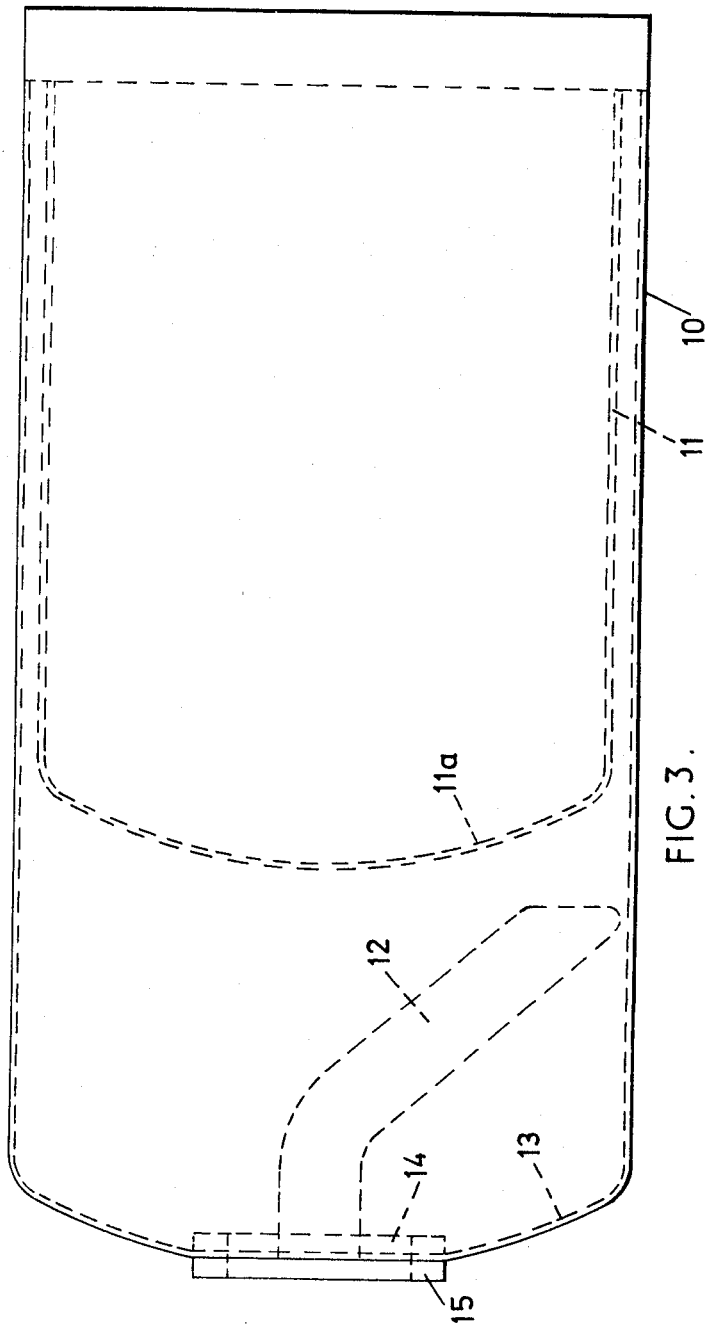
FIG. 3 is a longitudinal section of an autoclave according to a second embodiment in which the jacket is made longer than usual.

According to the embodiment illustrated by FIG. 3, the capacity of the jacket 10 is increased to enable it to contain a required quantity of water by making the jacket longer than usual instead of increasing the diameter thereof, so that the jacket extends rearwardly of the inner and 11a of the pan 11, and in this case electric immersion heaters 12 can be fitted to the wall 13 at the rear end of the jacket so as to extend radially into the latter.

Conveniently a bolting flange 14 is fitted centrally on said wall 13 and fitted with a cover plate 15 which holds the electric elements in position so that if they need changing it is only necessary to remove one unit and to replace it by another. Preferably, the opening in which the elements are fitted is large enough so that with the cover plate 15 removed it constitutes a man-hole through which a workman can pass into the inside of the jacket for inspection, maintenance or repair purposes.

According to a third embodiment, not illustrated, the jacket is made both larger in diameter and longer, and heating means is provided in both the resulting annular space and also in the space between the rear wall of the jacket and the rear wall of the inner pan.

In the illustrated embodiments the door at the front of the inner pan has been omitted as this forms no part of the invention.

I claim:

1. A jacketted steam-raising autoclave comprising:

a. a cylindrical outer jacket made of thick steel plate to provide a wall thickness of one-half inch capable of withstanding a steam pressure of several atmospheres and closed at its rear end by a domed end wall, b. a cylindrical inner pan made of thick steel plate to provide a wall thickness of one-half inch capable of withstanding a steam pressure of several atmospheres and closed at its rear end by a domed end wall, c. said jacket and inner pan being dimensioned to provide between themselves an annular space between their cylindrical walls and a space between their domed end walls in which steam can be generated from water supplied to said spaces, d. the adjacent front ends of said jacket and inner pan being secured together to close the front end of said annular space, e. a closure door fitted to the front of said inner pan, f. electric heating means secured to the jacket for heating the water in the spaces between the outer jacket and said inner pan for generating steam to said pressure of several atmospheres, g. pipe means for feeding steam from the top of said outer jacket to said inner pan, and h. pressure gauges and cut-outs devices being fitted on said jacket for the normal steam-raising in said spaces.

2. A jacketted steam-raising autoclave as claimed in claim 1, wherein the size of the annular space between the cylindrical walls constitutes a major space sufficient to enable steam to be raised therein by means of electric immersion heating elements extending horizontally in the lower part of said annular space and supported at one set of ends by the domed end wall of the outer jacket and at their other set of ends by a plate fitted in said annular space.

3. A jacketted steam-raising autoclave as claimed in claim 1, wherein the size of the space between the rear wall of the inner pan and the rear wall of the outer jacket constitutes a major water containing and steam-generating space into which extend electric immersion heaters mounted on the rear wall of the outer jacket.

4. A jacketted steam-raising autoclave as claimed in claim 1, wherein the electric heating means comprises heating elements secured to the outer surface of the jacket.

5. A jacketted steam-raising autoclave as claimed in claim 1, comprising immersion heaters fitted in both the annular space between the cylindrical walls of the jacket and inner pan and also between the end walls thereof.

* * * * *